United States Patent [19]

Scholz et al.

[11] Patent Number: 5,151,116
[45] Date of Patent: Sep. 29, 1992

[54] SORPTION COLUMN FOR WASTE-GAS CLEANING

[75] Inventors: Christoph Scholz, Schiersee; Yassilios Sefalidis, München, both of Fed. Rep. of Germany

[73] Assignee: CS Halbleiter- und Solartechnologie GmbH, München, Fed. Rep. of Germany

[21] Appl. No.: 827,410

[22] Filed: Jan. 29, 1992

[30] Foreign Application Priority Data

Feb. 1, 1991 [DE] Fed. Rep. of Germany ....... 4102969

[51] Int. Cl.$^5$ ............................................. B01D 53/04
[52] U.S. Cl. ...................................... 55/387; 55/418; 55/420; 55/DIG. 9
[58] Field of Search ................. 55/163, 179, 213, 387, 55/417, 418, 420, DIG. 9

[56] References Cited

U.S. PATENT DOCUMENTS

| | | | |
|---|---|---|---|
| 4,197,098 | 4/1980 | Stiehl et al. | 55/DIG. 9 X |
| 4,334,900 | 6/1982 | Neumann | 55/DIG. 9 X |
| 4,566,952 | 5/1981 | Turek | 55/387 X |

FOREIGN PATENT DOCUMENTS

| | | |
|---|---|---|
| 2605788 | 2/1976 | Fed. Rep. of Germany . |
| 8717750.1 | 3/1987 | Fed. Rep. of Germany . |
| 8903669.7 | 3/1989 | Fed. Rep. of Germany . |
| 1565840 | 4/1980 | United Kingdom . |

OTHER PUBLICATIONS

"Umwelt", vol. 19 (1989), No. 4, Apr., p. 227.

*Primary Examiner*—Charles Hart
*Attorney, Agent, or Firm*—Flynn, Thiel, Boutell & Tanis

[57] ABSTRACT

A sorption column for waste-gas cleaning having at least one vat containing a solid stationary sorbent and connected with a lower gas connecting piece and an upper gas connecting piece. The lower gas connecting piece has a coupling member. The vat adapted to be placed on the lower gas connecting piece as a valve in its cover and a valve in its bottom. The upper gas connecting piece has a coupling member. The coupling member of the lower gas connecting piece is adapted to be joined with the valve in the vat bottom and the valve in the vat cover. The valve in the vat bottom and the valve in the vat cover open when joined with the coupling member of the lower gas connecting piece so as to form a gas space communicating from the lower gas connecting piece to the upper gas connecting piece.

14 Claims, 4 Drawing Sheets

SORPTION COLUMN FOR WASTE-GAS CLEANING

The present invention relates to a sorption column for waste-gas cleaning according to the preamble of claim 1.

Waste gas from toxic gases, e.o. phosphine or arsine, or genotoxic gases, such as carbon tetrachloride, are cleaned using sorption columns filled with a sorbent for adsorbing the toxic or genotoxic gas in question on the surface of the sorbent or absorbing it by reaction with the sorbent.

When the sorbent is contaminated it must be transported to a special refuse disposal unit. For this purpose the contaminated sorbent must be transported in a container which is approved for transport of particularly dangerous materials or special refuse under the relevant regulations, such as the Dangerous Material Ordinance for Roads (GGVS) in Germany or the international ADR Convention.

Nowadays one generally loosens the flanged joints on the gas inlet and gas outlet connections of the column and then transfers the contaminated sorbent in the column to such approved transport vessels, or one puts the column as a whole into an approved transport vessel. However, there is a considerable danger of toxic cases leaking out after the flanges are loosened, not least due to air humidity entering the column, which can lead to a release of toxic gases. The transport of a large column as a whole furthermore requires large, awkward-shaped special vessels which must go through an elaborate approval procedure.

The German journal "Umwelt", Vol. 19, 1989, No. 4, April, page 227, discloses an absorber for waste-gas clean-ing having a vat containing a solid, stationary absorbent, the vat being connected with a base portion and with a head portion. The known absorber is capable of mobile operation and can be directed to different emission sources.

DE 26 05 788 A1 and DE 87 17 750.1 U1 disclose absorption columns comprising a plurality of stacked housing segments which are charged with a sorbent. For charging and emptying the sorbent flaps are provided laterally on the housing segments according to DE 87 17 750.1 U1, and a feed opening on the top of the uppermost housing segment and an outlet port on the underside of the lowermost housing segment according to DE 26 05 788 A1. DE 89 03 669.7 U1 also indicates a container filled with a sorbent having a feed opening on the top and an outlet port on the underside as well as a lateral inlet for the gas to be cleaned.

The present invention is based on the problem of providing a sorption column for cleaning waste gas from toxic gases, which permits safe and easy disposal of the sorbent when contaminated.

This is achieved according to the invention by the sorption column characterized in claim 1. The subclaims state advantageous embodiments of the invention.

With the inventive sorption column the dry sorbent, which preferably absorbs, i.e. chemically binds, the toxic gases, is contained in vats whose valves in the vat bottom and vat cover automatically open when they are placed on the vat portion of the column or stacked. Conversely, the valves of the vats close automatically when they are separated from each other or the undermost vat is removed from the base portion, i.e. the lower gas connecting piece, the generally forms the gas supply portion, and the uppermost vat is removed from the head portion, i.e. the upper gas connecting piece, which generally forms the gas outlet portion, in order to dispose of the sorbent in the column when it is contaminated. Thus, no air humidity can enter or toxic gases leak out when the column is taken apart to dispose of the contaminated sorbent.

The vats are absolutely leakproof, of a size which is easy to handle and can readily be designed so as to meet the relevant regulations for transport of special refuse or dangerous materials.

To be stackable, the vats preferably have approximately the same diameter. However, they may vary in height. In particular if a waste gas with a mixture of toxic gases is to be cleaned the individual vats can be filled with different sorbents in each case which are specific for the individual components of the toxic gas mixture.

A vat can also be empty or contain only a filter, for example in the form of a filter cartridge, in order, for example, to eliminate or adsorb dust or oil mist on the inner wall of the vat or in the filter. The term "sorbent" is thus used very widely according to the invention; it also includes empty vats capable of adsorption due solely to their inner structure, not only vats for dry bed absorption. Along with one or more vats with dry bed absorbents, bakeable vats or vats with oxidizing agents or vats for heat exchange can also be provided in the inventive sorption column constructed on the modular concept. The modular structure of the inventive column thus provides manifold possibilities of variation. Also, retrofitting and resetting with a change of process conditions is no problem.

In the following the invention shall be explained in more detail with reference to the schematic drawing, in which.

Figure 1:
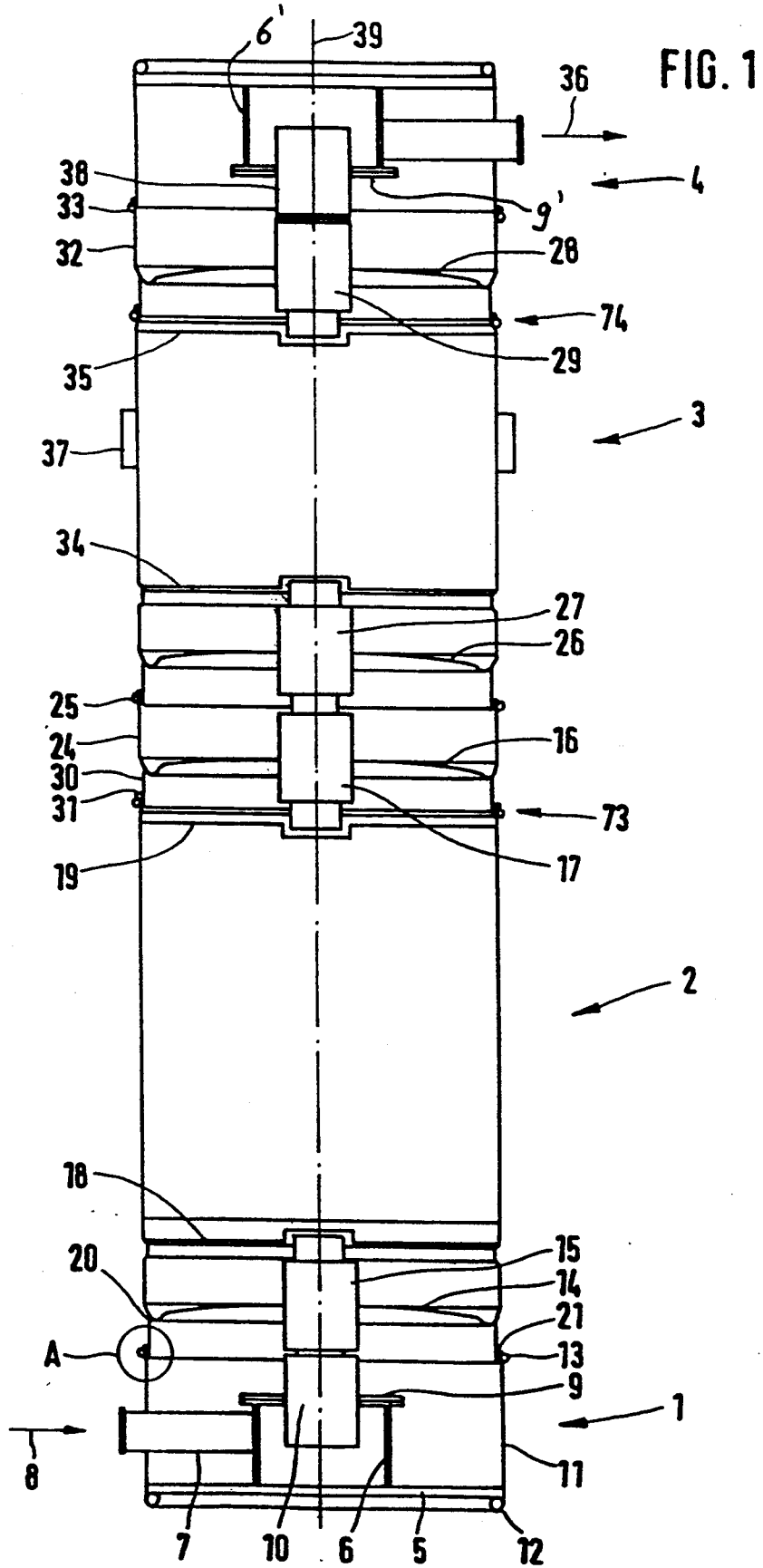
FIG. 1 shows a longitudinal section through an embodiment of the inventive sorption column.
Figure 3:
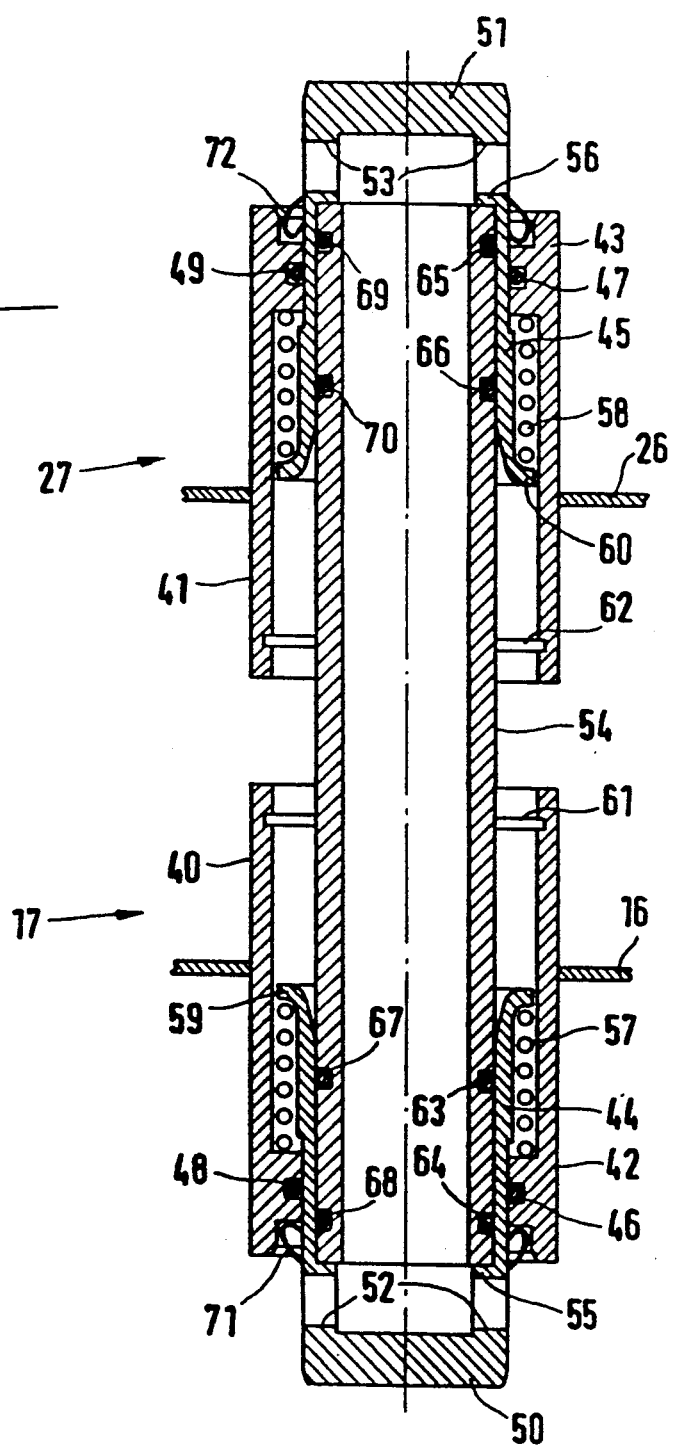
Figure 4:
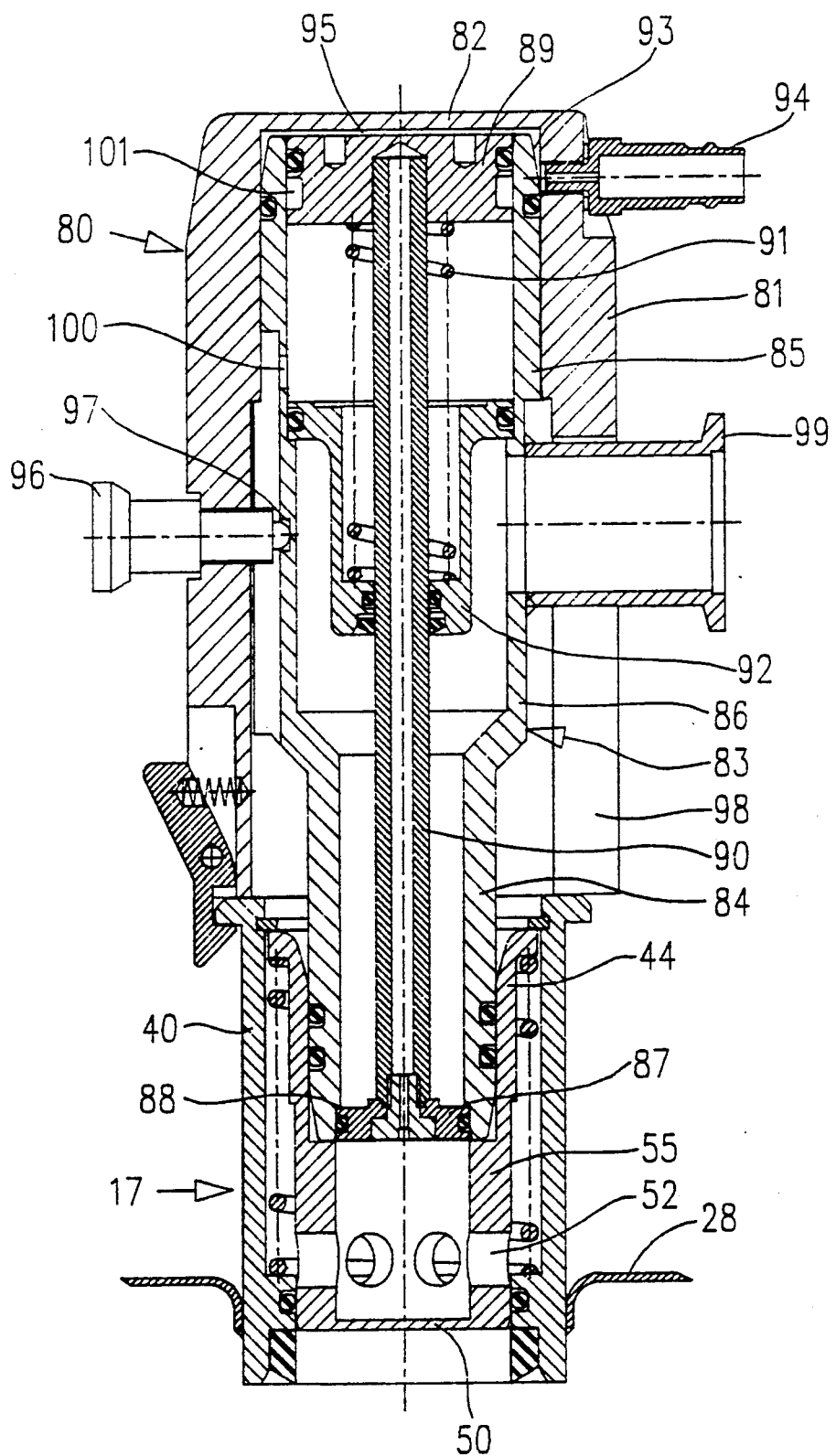
Figure 5:
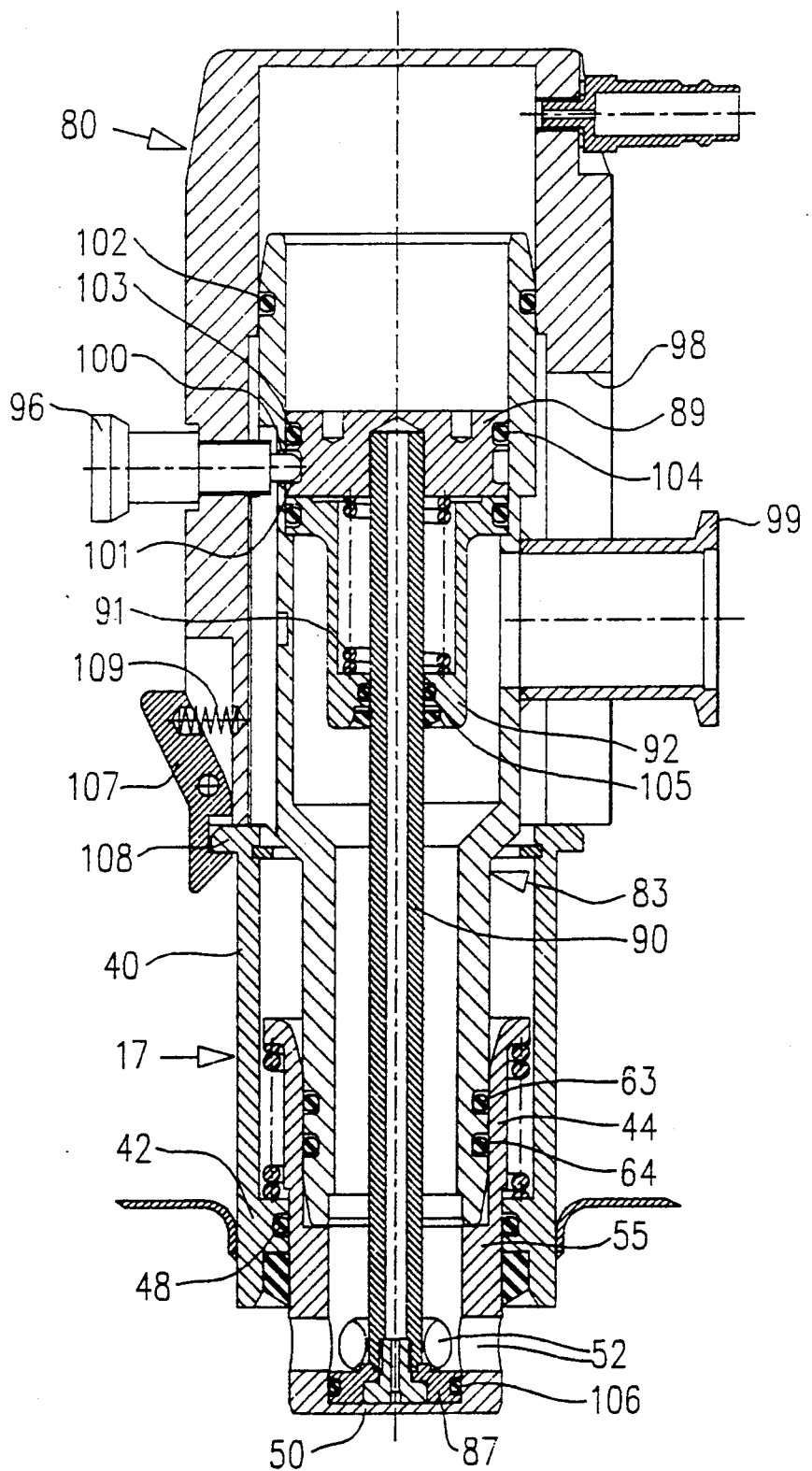

FIG. 3 shows a section through two joined open valves of two stacked vats of the column; and FIGS. 4 and 5 show a section through another embodiment of the coupling member in the closed and open positions, respectively, According to FIG. 1, the sorption column comprises a lower gas inlet portion or base portion 1 on which a first vat 2 is placed, and a second vat 3 placed on first vat 2, and an upper gas outlet portion or head portion 4 disposed on second vat 3. Base portion 1, vats 2 and 3 and head portion 4 are cylindrical, i.e. of circular cross section, with substantially the same diameter.

Base portion 1 has a bottom 5 in the center of which a cylindrical chamber 6 is disposed into which the waste gas to be cleaned flows into the sorption column via a pipe socket 7 according to arrow 8. Chamber 6 is closed at the top by a plate 9 in the center of which a coupling member 10 is disposed gastight.

Circumferential wall 11 of base portion 1 extends downwardly beyond bottom 5 so as to form a hoop-shaped base with an inwardly directed border 12 on which the column stands. The upper edge of circumferential wall 11 is provided with an outwardly directed border 13.

First vat 2 has a slightly upwardly bulging bottom 14 in the center of which a valve 15 is disposed gastight e.g. by welding, and a slightly upwardly bulging cover 16 in the center of which a valve 17 is disposed gastight, which can likewise be welded. A perforated plate 18, 19, screen or similar gas-permeable wall is provided above valve 15 in vat bottom 14 and below valve 17 in vat cover 16. The dry absorbent (not shown in the drawing) is disposed between perforated plates 18, 19. A hoop-shaped base 20 extends downwardly from vat bottom 14 beyond valve 15, being provided with an outwardly directed border 21 which engages over upper border 13 of base portion 1, as shown in more detail in FIG. 2.

Figure 2:
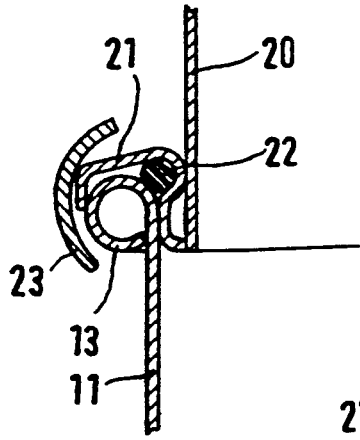
FIG. 2 shows an enlarged view of detail A of FIG. 1.

According to FIG. 2, a ring 22 made of rubber or another elastic material is disposed between the two cooperating borders 13 and 21. Borders 13 and 21 placed one on the other are embraced by a tension ring 23 which, when tightened, firmly presses borders 13 and 21 together, thereby ensuring a reliable attachment of vat 2 to base portion 1, A hoop-shaped projection 24 extends beyond cover 16 of vat 2 beyond valve 17. On its upper edge, projection 24 of vat 2 is provided with a border 25 corresponding to border 13 on the upper edge of base portion 1. Hoop-shaped projection 24 with border 25 forms a second base for vat 2 when the latter is removed from the column and turned over.

Second vat 3 is shorter but otherwise of the same design as first vat 2. That is, it has a valve 27 in its bottom 26 and a valve 29 in its cover 28. Lower hoop-shaped projection 30 of vat 3 is provided with a border 31, and upper hoop-shaped projection 32 with a border 33, hoopshaped projections 30 and 32 and borders 31 and 33 being of the same design as hoop-shaped projections 20 and 24 and borders 21 and 25 of vat 2. The same applies to perforated plates 34 and 35 in second vat 3. Also, vats 2 and 3 are interconnected with a tension ring in the same way as illustrated in FIG. 2.

Head portion 4 with coupling member 38 likewise corresponds in all substantial details to base portion 1 except that it is turned upside down, so head portion 4 need not be explained in more detail. The cleaned waste gas leaves the column through head portion 4 following arrow 36.

The column is held further by a ring 37 disposed about second upper vat 3 and fixed to a rack or the like. As apparent from FIG. 1, the longitudinal center axis of base portion 1, vats 2 and 3 and head portion 4 coincides with longitudinal center axis 39 of the sorption column.

As shown in FIG. 1, coupling members 10 and 38 in base portion 1 and head portion 4 and valves 15, 17, 27 and 29 are all coaxial with longitudinal center axis 39 of the sorption column.

FIG. 3 shows valves 17 and 27 in vat cover 16 and vat bottom 26 in more detail, which interconnect vats 2 and 3.

Thus, each valve 17, 27 has a cylindrical valve box 40, 41 welded into vat cover 16 or vat bottom 26. Valve box 40, 41 is provided at its end facing the interior of corresponding vat 2 or 3 with an inner ring 42, 43 on which a sleeve-shaped valve gate 44, 45 is guided displaceably and gastight. For this purpose ring 42, 43 has a groove 46, 47 on its inside, in which a seal ring 48, 49 is disposed. Sleeve-shaped valve gate 44, 45 is closed at its end facing the interior of corresponding vat 2 or 3 by a bottom 50, 51 but is provided on its circumferential wall with gas bores 52, 53 before bottom 50, 51, A pipe 54 inserted into the open end of sleeve-shaped valve gate 44, 45 facing away from corresponding vat 2 or 3 interconnects valve gates 44, 45 and is supported on an inner ring 55, 56 on valve gate 44, 45 which is disposed on the side of gas bores 52, 53 facing away from bottom 50, 51.

FIG. 3 shows valves 17 and 27 in the open position, That is, valve gates 44, 45 are pushed by pipe 54 into corresponding vat 2 or 3 in such a way that the interior of particular vat 2 or 3 communicates via gas bores 52, 53 with the interior of pipe 54. The interior spaces of vats 2 and 3 thus communicate with each other via valves 17 and 27 and pipe 54.

However, in their closed position valves 17 and 27 are spring-loaded. For this purpose a valve spring designed as a compression spring 57, 58 is provided which is supported on inner ring 42, 43 on valve box 40, 41, on the one hand, and on an outer ring flange 59, 60 on the end of valve gate 44, 45 facing away from particular vat 2 or 3, on the other hand. When valve gates 44, 45 move into the closed position, bottom 50, 51 moves at the end of valve gate 44, 45 facing particular vat 2 or 3 to the level of inner rings 42, 43 on valve box 40, 41, thereby closing gas bores 52, 53. This position thus comes about automatically when vats 2, 3 and thus valves 17 and 27 are removed from each other. In order for valve gates 44, 45 to be fixed in the closed position of valves 17, 27, ring-shaped stops 61, 62 are provided on the inside of valve box 40, 41 against which outer ring flanges 59, 60 come to lie in the closed position.

Pipe 54 is sealed from valve gates 44, 45 by grooves 63 to 66 containing seal rings 67 to 70 provided at both ends of pipe 54. Seal rings 67 to 70, like seal rings 48 and 49, are disposed in such a way that they do not come in contact with the waste gas to be cleaned.

When vats 2, 3 are stacked so as to form the sorption column, valves 17 and 27 are open as shown in FIG. 3, i.e. valve gates 44, 45 protrude with gas bores 52, 53 into corresponding vat 2 or 3. Solids can therefore deposit in the area of bores 52, 53 on the outside of valve gate 44, 45 and impair or even prevent the displacement of valve gate 44, 45 into valve box 40, 41 and thus the closing of valve 17 or 27. This is ruled out by providing scraper rings 71, 72 at the end of valve box 40, 41 facing particular vat 2 or 3.

Valve 15 in the bottom of vat 2 is of the same design as valve 27 in the bottom of vat 3, and valve 29 in the cover of vat 3 is the same as valve 17 in the cover of vat 2. However, coupling member 10 in base portion 1 and coupling member 38 in head portion 4 can only consist of a pipe corresponding to pipe 54. Coupling members 10 and 38 in base portion 1 and head portion 4 can also be designed as closable valves in accordance with valves 17 and 27 as in FIG. 3.

When the sorbent in vats 2 and 3 is contaminated, tension rings 23 are loosened between vats 2 and 3 and between base portion 1 and vat 2 and head portion 4 and vat 3, so that vats 2 and 3 can be taken from the column. Valves 15, 17, 27 and 29 thereby close automatically. Pipes 54 can now be removed and absolutely leakproof vats 2 and 3 transported away without trouble for disposal of the contaminated sorbent contained therein.

To permit vats 2, 3 to be filled and emptied, covers 16, 28 have a removable design, for example through tension ring seals which correspond to the tension ring connection shown in FIG. 2, whereby such a connection can be provided in the circumferential wall of vat 2 or 3 between cover 16, 28 and perforated plate 19, 35 therebelow, as indicated by reference numbers 73 and 74 in FIG. 1.

As mentioned, the coupling member of upper gas connection or head portion 4 can be designed in accordance with valve 27 according to FIG. 3, in which case plate 9' of chamber 6' in FIG. 1 replaces vat bottom 26 as in FIG. 3. It is evident, however, that the gas contained in pipe 54 can escape upon decoupling in this embodiment, for example, FIGS. 4 and 5 show another embodiment of a coupling member 80 which forms the upper gas connection or head portion. The valve with which the gas outlet portion is connected corresponds to valve 17 in FIG. 3, so that this valve need not be discussed in any detail. Valve 17 is located in cover 28 of upper vat 3 in FIGS. 4 and 5.

Coupling member 80 according to FIGS. 4 and 5 has a cylindrical housing 81 which is closed on the side facing away from valve 17 by end wall 82. In housing 81 a sleeve-shaped body 83 is displaceably guided. Sleeve-shaped body 83 comprises a small-diameter, lower portion 84 engaging valve 17, which corresponds to pipe 54 as in FIG. 3, an upper portion 85 which lies gastight against the inside wall of housing 81, and a middle portion 86 between lower portion 84 and upper portion 85, Lower portion 84 is supported, like pipe 54 as in FIG. 3, on inner ring 55 of valve gate 44 of valve 17.

Sleeve-shaped body 83 at the same time forms the valve box for a valve integrated into housing 81 of coupling member 80. Valve disk 87 of this valve is of disk-shaped design and, in the closed position shown in FIG. 4, it lies against a ring shoulder 88 which forms the valve face and is formed by a broadened inside diameter on the side of lower portion 84 of sleeve-shaped body 83 facing inner ring 55 of valve gate 44 of valve 17.

Valve disk 87 is guided displaceably and gastight in inner ring 55. In its open position according to FIG. 5 valve disk 87 is disposed on bottom 50 of valve gate 44 thereby unblocking openings 52.

Valve disk 87 is operated by a piston 89 guided displaceably in upper portion 85 of sleeve-shaped body 83, with which it is connected via a piston rod 90. Valve disk 87 is loaded against valve face 88 with a compression spring 91. Spring 91 extends about piston rod 90 and is supported on piston 89, on the one hand, and on a cup-shaped spring box 92 in middle portion 86 of sleeve-shaped body 83, on the other hand, in which piston rod 90 is guided displaceably and gastight.

Due to a taper 93 of the outside of upper portion 85 of sleeve-shaped body 83 on the side facing end wall 82 of housing 81, a link is established in the closed position of coupling member 80 according to FIG. 4 from a compressed air connection 94 on the upper end portion of housing 81 to a slit-shaped pressure space 95 between piston 89 and end wall 82. Due to a stop bolt 96 which is affixed in housing 81 and engages a recess 97 on middle portion 86 of sleeve-shaped body 83 in the closed position according to FIG. 4, body 83 can be secured from displacement in the closed position according to FIG. 4.

A gas inlet connection 99 extends through a longitudinal slot in housing 81, opening in the interior of sleeve-shaped body 83 in the area of middle portion 86. Sleeve-shaped body 83 has a bore 100 which, in the closed position according to FIG. 4, extends above parting wall 92. Piston 89 is provided with a recess 101 in the shape of a snap ring groove. Reference numbers 102 to 106 mark seal rings.

To connect coupling member 80 with valve 17, a plurality of hooks are pivoted on housing 81 so as to form spring-loaded catches, whereby only hook 107 is to be seen in FIGS. 4 and 5. Hook 107 engages over an outwardly extending ring flange 108 on valve box 40 of valve 17 and is loaded by a spring 109 in the locked position.

When pressure space 95 shown in FIG. 4 is pressurized with compressed air supplied via connection 94, piston 89 moves downwardly as far as the stop on parting wall 92, and the valve gate 87 moves from valve face 88 to bottom 50 of valve gate 44.

After this, piston 89 pressing against parting wall 92 takes along sleeve-shaped body 83 downwardly, so that the latter, since it lies against inner ring 55, moves valve gate 44 downwardly into the open position shown in FIG. 5. This position is locked by a stop bolt 96 which engages recess 101 from outside through bore 100 in sleeve-shaped body 83. The compressed air can then be switched off. With the embodiment of coupling member 80 as in FIGS. 4 and 5, virtually no more toxic waste gas can pass into the open or ambient air into the column. The lower gas connecting piece can be designed in the same way.

Coupling member 80 shown in FIGS. 4 and 5 can also be used for other purposes, e.g. for evacuating containers to be closed with a valve corresponding to valve 17.

We claim:

1. A sorption column for waste-gas cleaning having at least one vat containing a solid, stationary sorbent and connected with a lower gas connecting piece and an upper gas connecting piece, characterized in that the lower gas connecting piece (1) has a coupling member (10), the vat (2, 3) adapted to be placed on the lower gas connecting piece (1) has a valve (17, 29) in the vat cover (16, 28) and a valve (15, 27) in the vat bottom (24, 26), and the upper gas connecting piece (4) has a coupling member (38, 80), whereby the coupling member (10) of the lower gas connecting piece (1) is adapted to be joined with the valve (15) in the vat bottom (14) and the coupling member (38, 80) of the upper gas connecting piece (4) is adapted to be joined with the valve (29) in the vat cover (28), and the valve (15) in the vat bottom (14) and the valve (29) in the vat cover (28) open when joined with the coupling member (10) of the lower gas connecting piece (1) and the coupling member (38, 80) of the upper gas connecting piece (4), respectively, so as to form a gas space communicating from the lower gas connecting piece (1) to the upper gas connecting piece (4).

2. The sorption column of claim 1, characterized in that a plurality of stacked vats (2, 3) containing sorbents are provided between the lower gas connecting piece (1) and the upper gas connecting piece (4) which vats are each provided with a valve (17, 29) in the vat cover (16, 28) and a valve (15, 27) in the vat bottom (14, 26), whereby the valve (17) in the vat cover (16) is adapted to be joined with the valve (27) in the vat bottom (26) of the vat (3) stacked thereon and both open when joined so as to form a gas space communicating between the vats (2, 3).

3. The sorption column of claim 1, characterized in that the coupling member (10) in the lower gas connecting piece (1), the valves (15, 17, 27, 29) in the vat or vats (2, 3) and the coupling member (38, 80) in the upper gas connecting piece (4) are disposed coaxially with the longitudinal center axis (39) of the sorption column.

4. The sorption column of claim 1, characterized in that each vat (2, 3) has a border (21, 31 or 25, 33) on its lower edge and its upper edge, whereby the border (21, 31) on the lower edge engages over the border (25, 33) on the adjacent upper edge (13, 25, 33).

5. The sorption column of claim 1, characterized in that the valves (15, 27 or 17, 29) in the bottom (14, 26) and cover (16, 28) of each vat (2, 3) have a valve box (40, 41) inserted gastight in the vat bottom (14, 26) or vat cover (16, 28), in which a sleeve-shaped valve gate (44, 45) is guided displaceably in the longitudinal direction of the vat, being loaded by a spring in the closed position away from the interior of the corresponding vat (2, 3), closed at its end facing the interior of the corresponding vat (2, 3), and provided on its circumference with at least one gas opening (52, 53), whereby the gas opening (52, 53) is closed by the valve box (40, 41) in the closed position and whereby a pipe (54) is provided which protrudes into the open ends of the valve gates (44, 45) facing each other and is supported on the valve gates (44, 45) in order to urge the valve gates (44, 45) into the open position when the vats (2, 3) are stacked.

6. The sorption column of claim 5, characterized in that the valve box (40, 41) has an inner ring (42, 43) which closes the gas opening (52, 53) in the closed position.

7. The sorption column of claim 5, characterized in that an inner ring (55, 56) is provided in the valve gate (44, 45) on which the pipe (54) is supported with its ends.

8. The sorption column of claim 5, characterized in that the valve box has an inner ring and the valve gate has an outer ring, and in that the spring which loads the valve gate (44, 45) in the closed position is a compression spring (57, 58) supported on the inner ring of the valve box (42, 43), on the one hand, and on the outer ring (59, 60) of the valve gate (44, 45), on the other hand.

9. The sorption column of claim 5, characterized in that the valve box has an inner ring and in that the valve gate (44, 45) is sealed from the valve box (40, 41) by a seal (48, 49) disposed in the inner ring (42, 43) of the valve box (40, 41).

10. The sorption column of claim 5, characterized in that the pipe (54) is sealed from the valve gate (44, 45) by a seal (63 to 66) disposed on the pipe circumference.

11. The sorption column of claim 5, characterized in that a scraper ring (71, 72) is disposed on the end of the valve box (40, 41) facing the corresponding vat and engages the outer circumference of the valve gate (44, 45).

12. The sorption column of claim 5, characterized in that at least one of the upper and lower gas connecting pieces is formed by a coupling member (80) having a housing (81) in which a sleeve-shaped body (83) is displaceably guided, the sleeve-shaped body (83) of the upper gas connecting piece protrudes with one end into the open end of the valve gate (44) of the valve (17) is the cover (28) of the adjacent vat (3), and the sleeve-shaped body (83) of the lower gas connecting piece protrudes with one end into the open end of the valve gate of the valve in the bottom (14) of the adjacent vat (2), said one end of the sleeve-shaped body (83) being adapted to be closed by a valve gate (87), which in the open position of the last mentioned valve (17) is located at the bottom (50) of the valve gate (44) of the last mentioned valve (17), the other end of the sleeve-shaped body (83) being closed by a wall (92), a gas connecting piece (99) being provided which opens into the sleeve-shaped body (83) between said one end and the wall (92).

13. The sorption column of claim 12, characterized in that for operating the valve gate (87) of the sleeve-shaped body (83) a pressurized piston is provided in the coupling member (80), being displaceably disposed in the sleeve-shaped body (83) on that side of said wall (92) which faces away from the valve gate (87) of the sleeve-shaped body (83), the piston (89) being connected with the last mentioned valve gate (87) by a piston rod (90) penetrating said wall (92) in gastight fashion.

14. The sorption column of claim 13, characterized in that the sleeve-shaped body (83) and the piston (89) are adapted to be locked in the open position of the last mentioned valve (17).

* * * * *

UNITED STATES PATENT AND TRADEMARK OFFICE
CERTIFICATE OF CORRECTION

PATENT NO. : 5 151 116
DATED : September 29, 1992
INVENTOR(S) : Christoph SCHOLZ et al It is certified that error appears in the above-identified patent and that said Letters Patent is hereby corrected as shown below:

On the title page, item [75]; replace "Yassilios" with
---Vassilios---.

Column 8, line 15; replace "is" with ---in---.

Signed and Sealed this

Second Day of November, 1993

*Attest:*

BRUCE LEHMAN

*Attesting Officer*      *Commissioner of Patents and Trademarks*